Jan. 17, 1961  L. YOUNG ET AL  2,968,182
INSTRUMENT ASSEMBLY HAVING DIAPHRAGM RELAY
WITH INTERIOR ZERO SETTING BEAM
Filed May 9, 1956  5 Sheets-Sheet 1

INVENTORS
LLEWELLYN YOUNG
PHILIP M. TAYLOR
DONALD A. BROCKMAN
BY
Arthur L. Wade
ATTORNEY Jan. 17, 1961

L. YOUNG ET AL 2,968,182

INSTRUMENT ASSEMBLY HAVING DIAPHRAGM RELAY
WITH INTERIOR ZERO SETTING BEAM

Filed May 9, 1956

INVENTORS
LLEWELLYN YOUNG
PHILIP M. TAYLOR
DONALD A. BROCKMAN

BY Arthur L. Wade

ATTORNEY

INVENTORS
LLEWELLYN YOUNG
PHILIP M. TAYLOR
DONALD A. BROCKMAN
BY Arthur L. Wade
ATTORNEY INVENTORS
LLEWELLYN YOUNG
PHILIP M. TAYLOR
DONALD A. BROCKMAN
BY Arthur L. Wade
ATTORNEY United States Patent Office 2,968,182
Patented Jan. 17, 1961

2,968,182

INSTRUMENT ASSEMBLY HAVING DIAPHRAGM RELAY WITH INTERIOR ZERO SETTING BEAM

Llewellyn Young, Croydon, and Philip Maurice Taylor and Donald Alan Brockman, Shirley, England, assignors to Bailey Meter Company, Cleveland, Ohio, a corporation of Delaware Filed May 9, 1956, Ser. No. 583,652

8 Claims. (Cl. 73—408)

This invention relates to instrument assemblies comprising instruments of the kind operated by a diaphragm or bellows movable in response to pressure difference, and to diaphragm operated instruments suitable for use in such assemblies. Not infrequently a diaphragm or bellows operated instrument is required to respond to positive pressures or suctions or pressure differences of small value, for example, pressures varying between 1″ water gauge and zero pressure. As a result, diaphragms or bellows of substantial area are required in order to obtain adequate operating forces and the instruments consequently need an undue amount of panel space. Since not infrequently a substantial number of instruments of the kind in question is required in an installation, a convenient disposition of the instruments in conventional manner may become difficult or impossible to achieve.

An object of the invention is the provision of an instrument assembly whereby an economy in horizontal space is obtained. Another object is to provide an improved diaphragm operated instrument suitable for use in such an assembly. A further object is to provide an instrument assembly comprising diaphragm operated instruments of a basically uniform construction such that with little adaptation the instruments may be used over different ranges from a low range up to a high range and for the measurement of positive pressure, suction, pressure and suction, or pressure difference.

The present invention includes an instrument assembly, including two instruments each having a flexible member such as a diaphragm or a bellows movable in response to pressure difference, and scale means associated with two indexes respectively movable by the flexible members of the two instruments, one of the instruments being located above the other and the scale means being vertically elongated and disposed immediately in front of the instruments with the indexes arranged to move side by side.

The invention also includes an instrument having a diaphragm movable in response to pressure difference, wherein the diaphragm and casing are of elongated form and for supporting an index connected to an operating member the casing is formed with supporting means disposed to one side of the longitudinal axis of the casing whereby the insrtument may be disposed relative to another similar instrument with one instrument inverted and immediately above the other, with the axes of rotation of the indexes of the two instruments in axial alignment, with the respective support means side by side and with the casings in diverging relationship.

In an instrument or relay of this kind a positive pressure or a suction or the difference between two unequal positive pressures or suctions applied to the diaphragm may vary from zero through quite a small range of values, for example 1″ water gauge, so that to minimise friction in the moving parts is important. Particularly difficult conditions arise in the case of a differential instrument or relay subject to substantial internal positive pressures and required to respond to small pressure differences, since fluid-tight chambers must be provided on both sides of the diaphragm and if the movement of the diaphragm is transmitted to the outside of the instrument or relay casing by a lever passing through a flexible membrane and provided with pivots, fluid pressure on the membrane is transmitted to the pivots. This difficulty may be overcome by supporting the lever on a spring leaf, but this introduces complications on account of the force exerted on the lever by the spring leaf due to its resilience and on account of outward movement of the membrane under the fluid pressure.

The service required of diaphragm instruments and relays is diverse, since not only may response be required to suction or positive pressure or both suction and positive pressure or to pressure difference, but in different applications various ranges of suction or/and positive pressure or pressure difference come into question. As a corollary the pointer of an instrument may be required to have a normal or zero position at the centre of a scale or at the one or the other end of a scale. A great advantage would be gained if a diaphragm instrument or relay could, with but minor modifications be used to respond to positive pressure or suction or pressure and suction or to pressure difference and to different ranges of such variables.

An instrument or relay of the kind in question should comprise means for effecting adequate and accurate adjustment at zero setting, the parts of an insturment or relay should be protected as far as possible from mechanical damage and advantageously an instrument or relay for giving one service should be replaceable without difficulty by an instrument or relay for giving another service.

An indicating or/and recording instrument or relay in accordance with the present invention has a casing, a diaphragm within the casing movable in response to a pressure difference and so coupled to an element that the element is moved upon movement of the diaphragm from a normal or zero position to an extent dependent on the value of the pressure difference, and adjusting mechanism including a support pivotally mounted within the casing and carrying a biasing spring of leaf form coupled to the diaphragm, and means arranged by rocking the support to selected position to effect adjustment of the normal or zero position of the diaphragm.

The invention will now be described, by way of example, with reference to the accompanying partly diagrammatic drawings, in which.

Figure 1:
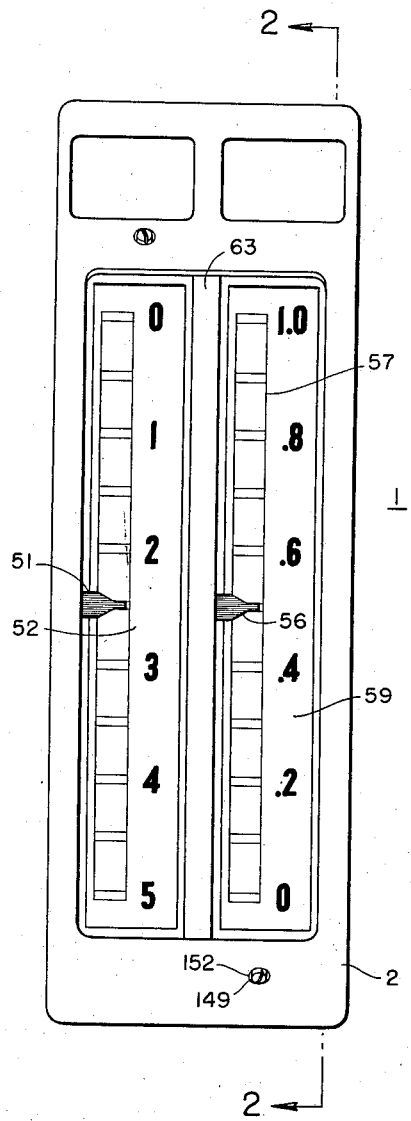
Figure 1 is a front view of an instrument assembly having two scales and two independent indicating flags or pointers.

The twin-instrument assembly shown in Figures 1 to 13 of the drawings comprises a housing 1 that contains the two instruments and includes a front cover 2, an intermediate instrument and housing supporting part 3 and a rear cover 4, removal of which gives access to the instruments. The front cover 2, the intermediate part 3 and the rear cover 4 are die castings and the intermediate part 3 is formed with parallel side walls and with upper and lower walls, 5 and 6 respectively, which converge rearwardly. At the front of the intermediate part 3 is a peripheral outwardly extending flange 7 formed with suitable screw holes (not shown) for securement of the front cover 2.

Disposed within the housing 1 are two pressure sensitive instruments 11 and 12 which are bolted respectively to the lower wall 6 and to the upper wall 5 of the housing and which are of similar construction with the exception that a pointer operating mechanism associated with the upper instrument 12 is modified, as will be described below with reference to Figure 13, in order to allow for the inverted state of the upper instrument.

The rear cover 4 is held to the intermediate part by two clamping screws (not shown) and the sides of the rear cover are parallel to one another and are connected by a rear wall 15, an upper wall 16 and a lower wall 17. Between the end of upper wall 16 and the top of the intermediate part 3 is an aperture 18 occupied by a projecting platform 20 on the base of the instrument 12 carrying nipples 21 and 22 for the application of the actuating fluid to the instrument. In a similar manner an aperture 24 between the lower wall 17 and the bottom of the intermediate part 3 is occupied by a projecting platform 25 on the base of the instrument 11 carrying nipples 26 and 27.

Figure 2:
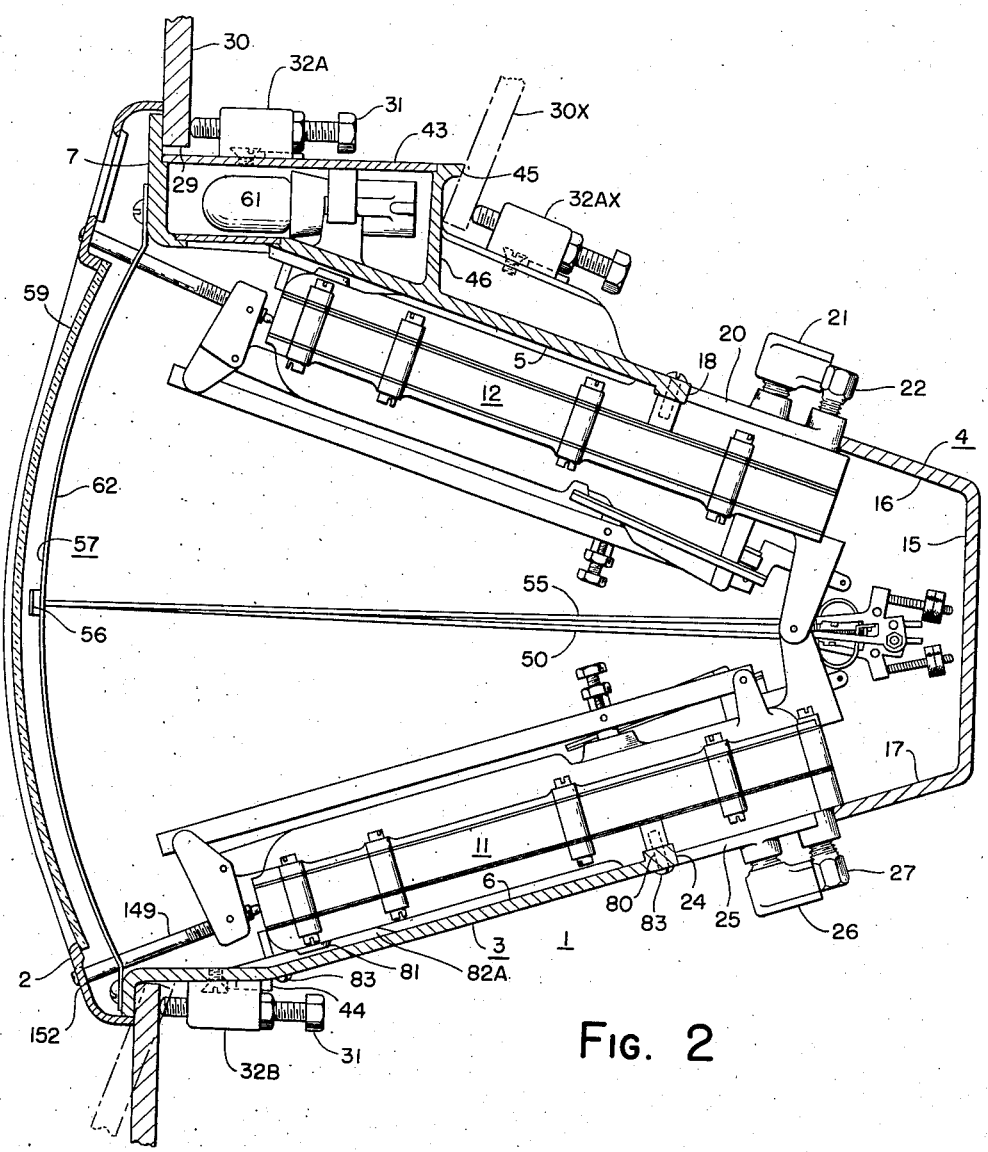
Figure 2 is a sectional side elevation taken on the line 2—2 of Figure 1 and as viewed in the direction indicated by the arrows; certain pointer mechanism associated with an upper of two pressure sensitive instruments shown therein being omitted.

The housing 1 is arranged to extend through an aperture 29 in an instrument panel 30 and to be selectively clamped to the panel in one of a plurality of positions in which the upright axis of the front cover is differently inclined in relation to the plane of the panel. Thus the housing may be secured to the panel as shown in Figure 2 by clamping the flange 7 at the front of the intermediate part 3 of the housing 1 against the front of the panel adjacent the aperture by means of clamping screws 31 acting on the back of the panel. Each clamping screw 31 screws through a threaded hole in a mounting bracket 32A or 32B readily separable from the intermediate part 3 of the housing 1, each mounting bracket being formed with a slot 35 terminating at its inner end with an arcuate bevelled surface 36 adapted to engage beneath the head of a screw 37 provided on the intermediate part 3 of the casing. Each mounting bracket 32A and 32B on its face adjacent the intermediate part of the housing is formed with spaced parallel projections adjacent the edges of the face providing a groove for engagement with complementary means of the intermediate part of the casing. Two mounting brackets 32A are provided at the top of the housing and the complementary locating means are provided by wall portions at opposite sides of a lamp box 43 and a single mounting bracket 32B is provided at the bottom of the housing on the outer surface of which a suitable locating lug 44 is provided.

Figure 17:
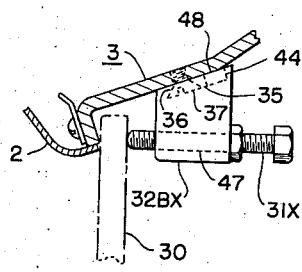
Figure 17 is a sectional side elevation of an alternative form of lower mounting bracket for the instrument assembly.
Figure 4:
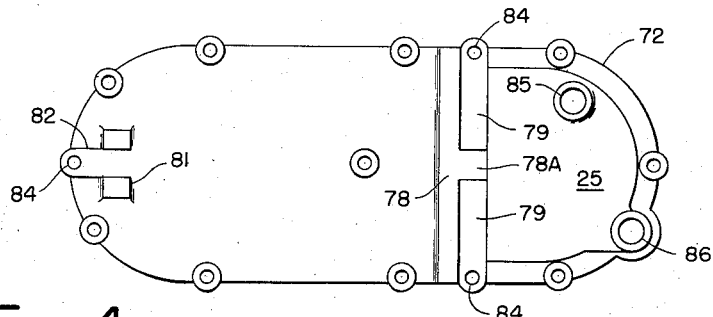
Figure 4 is a view of the underside of a base part of the instrument shown in Figure 3.
Figure 5:
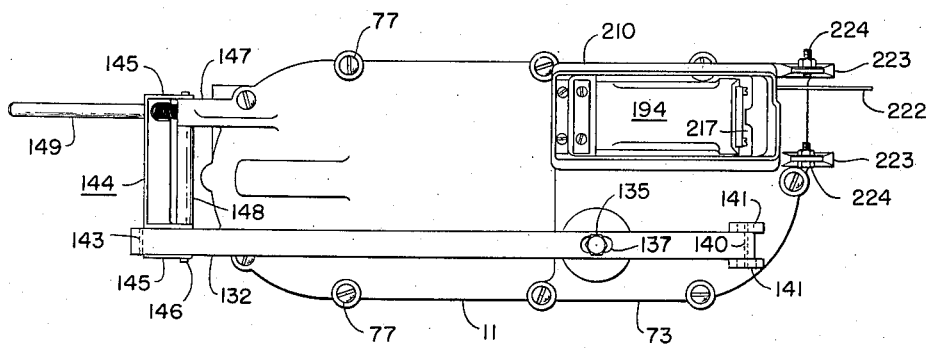
Figure 5 is a plan view of the instrument shown in Figure 3.

Alternatively the housing may be secured in relation to the panel 30 by clamping the peripheral flange 7 at the bottom of the intermediate part of the housing 1 against the panel and by clamping a shoulder 45 on rear wall 46 of the lamp box 43 against the part of the panel 30 above the aperture 29 (as indicated by the dotted outline at 30X in Figure 2), thus facilitating reading of the instruments when they are located at an appreciable height above the viewer. To this end, a single upper mounting bracket 32AX and a single lower mounting bracket 32BX (see Figure 17) may be used and the outer surface of the wall 5 of the intermediate part 3 of the housing 1 immediately rearwardly of the lamp box 43 is such that a mounting bracket of the nature described may be employed as shown in Figure 2. The lower mounting bracket 32B is modified as shown at 32BX in Figure 17 and the clamping screw hole 47 therein is so inclined in relation to that surface 48 of the mounting bracket which is in contact with the intermediate part of the housing that the screw 31X is substantially normal to the surface of the panel.

The lower instrument 11 is arranged to actuate an index in the form of a tubular indicating pointer 50 of lightweight metal that carries at its forward end a flag 51 which co-operates with an arcuate upwardly extending scale 52, secured at its top and bottom to the flanges 7 of the casing, to give an indication of a difference between two pressures applied to the instrument 11 through nipples 26 and 27 respectively. The upper instrument 12 is similarly arranged to actuate an index in the form of a pointer 55 carrying a flag 56 which co-operates with a scale 57 to give an indication of a difference between two pressures applied to the upper instrument 12 through nipples 21 and 22 respectively. The front cover 2 incorporates a transparent scale window 59 through which the scales 52 and 57 and the flags 51 and 56 may be viewed. An electric lamp 61 mounted in the lamp box 43 serves to illuminate the scales 52 and 57, which are drawn on arcuate scale holders 62 of translucent material, whilst on the front cover 2 is mounted an arcuate masking strip 63 for covering a gap left between the scale holders for the accommodation of the forward end of the index 55.

Each of the instruments 11 and 12 is a diaphragm operated instrument having an elongated diaphragm and an elongated casing the longitudinal axis of which extends rearwardly away from the associated scale.

The casing of instrument 11 comprises an intermediate part or spacer 71 of frame-like form, a base 72 formed with a peripheral upstanding flange adapted to register with the spacer and a top or cover 73 also formed with a peripheral flange adapted to register with the spacer. Diaphragm 74 is clamped between the base 72 and the spacer 71 by screws 75 passing through the base 72 and screwing into threaded holes 76 in the spacer. The cover 73 is also clamped, by screws 77, to the spacer 71, an intermediate gasket (not detailed) being provided for forming a fluid-tight joint. At the rear of the base 72 is the projecting platform 25.

The underneath of the base 72 is formed with bearing surfaces such that the instrument may be accurately positioned relative to the housing wall 6. Thus a shelf 78

(see Figure 4) immediately in front of the platform 25 provides a flat bearing surface and is formed with two transversely extending aligned slots 79 separated by an intermediate part 78A of the shelf 78, the housing wall 6 being provided with projecting parts such as the part 80 (see Figure 2) which extend within the slots 79. Near its forward end the base 72 is formed with two projections 81 which provide further flat bearing surfaces and between which is a gap 82 into which fits a complementary projection 82A (see Figure 2) on the housing wall 6. The instrument is clamped to the housing wall 6 by three screws 83 which screw into holes 84 provided in the base 72.

In the platform 25 are two threaded holes 85, 86 respectively for the nipples 26 and 27, the hole 85 having communication with space 87 between the base 72 and the diaphragm 74 and the hole 86 having communication by way of a duct 88 (see Figure 11) in the spacer 71 with space 89 between the cover 73 and the diaphragm 74. By means of the nipples 26 and 27 appropriate pipe connections may be made to the instrument.

The parts 71, 72 and 73 of the casing are formed by die casting suitably of an aluminum alloy. By such process the required accuracy is readily obtained for enabling the parts of instruments to be interchangeable or for an instrument to be removed from its housing or mounting and to be replaced by another instrument.

The edge portion of the diaphragm 74 is sandwiched between gaskets 90 and is clamped between the base 72 and the spacer 71 and the central portion of the diaphragm 74 is sandwiched between a pair of clamp plates 91 so shaped as to leave free an annular part 92 of the diaphragm that lies between the edges of the clamp plates and gaskets 90. A number of screws clamp together the diaphragm clamp plates 91 and one of these, 93, secures in position a rod 94 projecting at the centre of the diaphragm from the diaphragm clamp plates towards the cover 73 and connected by means including a transverse pin 178 to a diaphragm biassing leaf spring 96. The base 72 of the casing is penetrated by a screw (not shown) adopted by engaging the lower clamp plate suitably to limit downward diaphragm travel.

The biassing spring 96 is mounted on an adjustable support which is in the form of a beam 100 formed at its sides with upstanding flanges 101. The beam 100 is supported at its rear end by means of a short leaf spring 102, the rear end of which is secured to a shelf 103, formed on the casing spacer 71, by means of two screws 104 passing through holes in a clamp plate 105 and the short spring 102 and screwing into holes in the shelf 103. The rear end of the beam 100 is rigidly secured to the short spring 102 and to the biassing spring 96 by two countersunk screws 106 passing from above through an upper clamp bar 107, the biassing spring 96, a fixed spacer bar 108, the short spring 102, and the beam 100 and screwed at their lower ends into holes in a fixed spacer bar 109 positioned below the beam 100.

Means are provided for varying the effective rate of the biassing leaf spring 96. Thus disposed transversely of the biassing spring 96 and above the spring is a movable clamp bar 110 immediately below which, between the spring 96 and the beam 100, is a movable spacer 111. The clamp bar 110 and the spacer 111 are wider than the leaf spring 96 and two countersunk screws 112 extend downwardly through holes in the movable spacer 111, respectively through slots 113 in the beam 100 and screw at their lower ends into a movable lower clamp bar 114 positioned below the beam 100. The slots 113 extend in the direction of the length of the spring 96 and by slackening the screws 112 the assemblage of upper clamp bar 110, spacer 111 and lower clamp bar 114 may be slid longitudinally of the biassing spring 96 and, by tightening of the screws 112, locked in a selected position in which the part of the spring 96 which lies rearwardly of the clamp bar 110 has the desired rate.

The beam 100 is formed with an aperture 120 larger than the rod 94 which projects from the diaphragm plates so that the rod 94 extends freely through the beam 100. The rear end part of the biassing spring 96 is formed with a central slot 121 which lies immediately above the aperture 120.

It will be appreciated that the short spring 102 serves as a pivot for the beam 100; downward rocking movement of the beam is limited by a stop 125 formed integrally with the casing spacer 71 and upward rocking movement is limited by engagement of the free rearward end of the beam with the casing cover 73.

The beam 100 is spring-biased in a downward direction by a helical compression spring 126 (see Figure 7) arranged to act between the casing cover 73 and the beam, and of such stiffness that deflection of the diaphragm biassing spring 96 is ineffective to cause movement of the beam 100. The beam may be moved against the force of the spring 126 by a link rod 127 of circular cross-section hingedly connected at its lower end by a pin 128 to one of the side flanges 101 of the beam 100, the rod 127 extending axially upwards through the spring 126, through a sealing washer 130 trapped between the upper end of the spring 126 and the cover 73, and through an aperture 131 formed in the casing cover. At its upper end the rod 127 is pivotally connected to a lever 132 which is of inverted channel shaped cross-section and is disposed above the casing cover, the link rod being formed at its upper end with a screw-threaded axial bore 133 and being transversely slotted to take a transverse pivot pin 134. The pin 134 is retained in the bore by a screw 135 screwed into the threaded bore and locked in adjusted axial position by a locknut 136. The ends 134A of the pin 134 (see Figure 8) are of large diameter to provide large bearing surfaces where the pin passes through circular holes in side flanges of the lever 132 and the central part 134B of pin 134 is spherically formed so as to preclude its sideward movement out of bore 133. The lever 132 is formed with an aperture 137 through which the upper part of the rod 127 extends with a considerable clearance.

Figure 3:
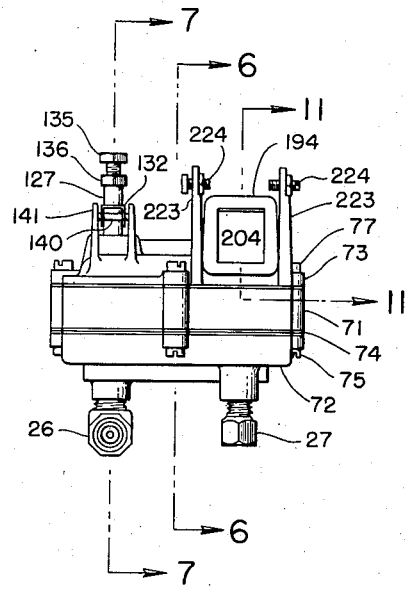
Figure 3 is a rear view of the lower of the two pressure sensitive instruments shown in Figure 2, a pointer and pointer coupling mechanism thereof being omitted.

The lever 132 extends longitudinally of the casing cover 73 and towards one side thereof, as is shown most clearly in Figure 3, and is supported by a fixed pivot pin 140 provided towards the rear end of the casing cover and extending between lugs 141 upstanding from the casing cover, the side flanges of the lever 132 being notched to engage the pin.

Near its forward end the lever 132 is supported by an abutment 143 which may be moved to rock the lever about the fixed pivot pin 140, the abutment being provided on a rocker 144 which includes parallel, spaced arms 145 by means of which the rocker is pivotally mounted on a pivot pin 146 mounted on lugs 147 formed integrally with the casing cover 73, and pivotally mounted on the arms 145 is an element 148 of cylindrical form formed with a transverse screw-threaded hole into which is screwed an adjusting shaft or screw 149, the rearward end of which bears against the casing spacer 71. It will be seen that the rocker 144 is in effect a double armed lever, the abutment 143 being to one side of the pivot pin 146 and the element 148 being mounted to the other side of the pin 146. The element 148 is formed at its ends with trunnions that fit respectively into a hole in one of the arms 145 and into a rearwardly extending slot in the other arm, so that the element is readily removable from the rocker 144.

From the above description, it will be appreciated that the adjusting screw 149 may be variably oriented in relation to the rocker 144; when the instrument 11 is mounted in the housing 1, the screw 149 projects through a hole 152 in the front cover 2 and through its engagement with the sides of the hole the appropriate orientation of the screw 149 is maintained.

When the instrument 11 is mounted in the housing 1, rotation of the adjusting screw 149 will cause rotary movement of the rocker 144 so that the abutment 143 causes the lever 132 to rock on its pivot pin 140 and through the pin 134 either cause the link rod 127 to rise and draw the beam 100 upwards against the effect of the spring 126, or permit the link rod 127 to fall under the effect of the spring 126 acting through the beam 100. Furthermore, a coarse or large adjustment of the position of the beam 100 relative to the casing of the instrument 11 may be obtained by slackening of the locknut 136, adjustment of the screw 135 and re-tightening of the locknut 136.

Since the diaphragm biassing spring 96 is mounted on the beam 100, pivotal movement of the beam 100 in the manner described will effect movement of the rearward end of the spring 96 in the direction of the axis of the rod 94, and thereby, through pointer operating mechanism, described below, coupling the rod 94 to the indicating pointer 50, effect repositioning of the flag 51 relative to the scale 52.

With the adjusting mechanism described above, the coarse adjustment obtained by adjustment of the screw 135 may be utilised to determine whether the flag 51 shall have its normal or zero position at one end, at the other end or at a mid-point of the scale 52, whilst a fine or vernier adjustment of the flag 51 to its zero point may be obtained by rotation of the adjusting screw 149, which is accessible from the front of the instrument panel with the instrument assembly in its operative position.

The construction and operation of the pointer mechanism interposed between the rod 94, which is attached to the diaphragm 74, and the pointer 50 may be most clearly seen from Figures 9 to 12 of the drawings.

Figure 9:
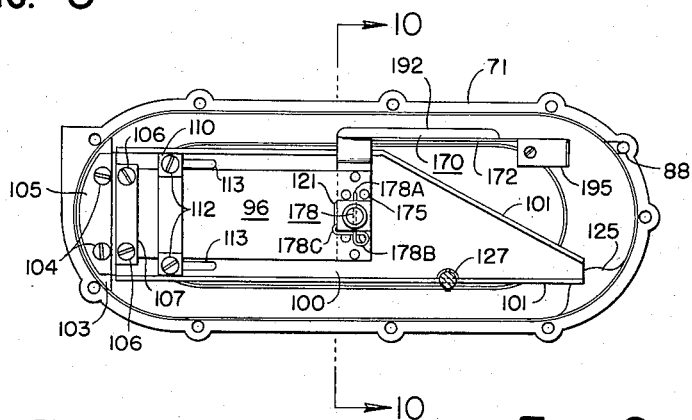
Figure 9 is a plan view of the instrument shown in Figure 3 with a cover part (and parts attached thereto) removed.
Figure 10:
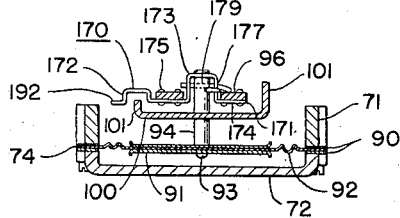
Figure 10 is a sectional front view taken on the line 10—10 of Figure 9 and as viewed in the direction indicated by the arrows.
Figure 6:
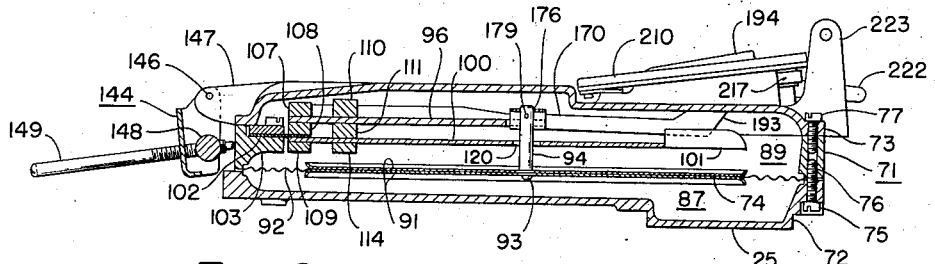
Figure 6 is a sectional side elevation taken on the line 6—6 of Figure 3 and as viewed in the direction indicated by the arrows.
Figure 7:
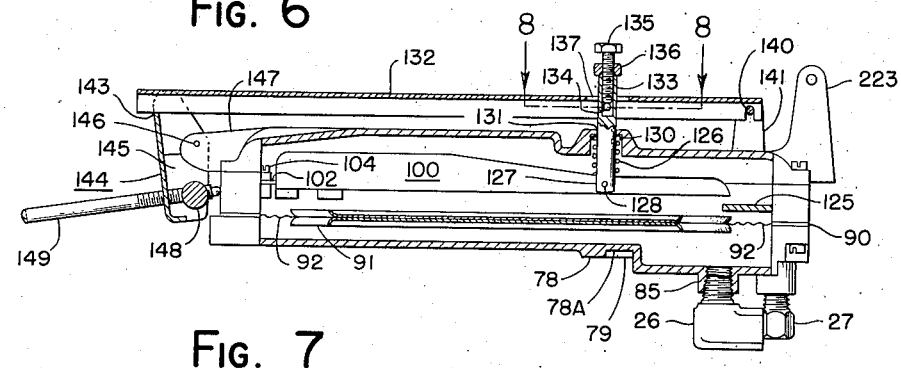
Figure 7 is a sectional side elevation taken on the line 7—7 of Figure 3 and as viewed in the direction indicated by the arrows.
Figure 11:
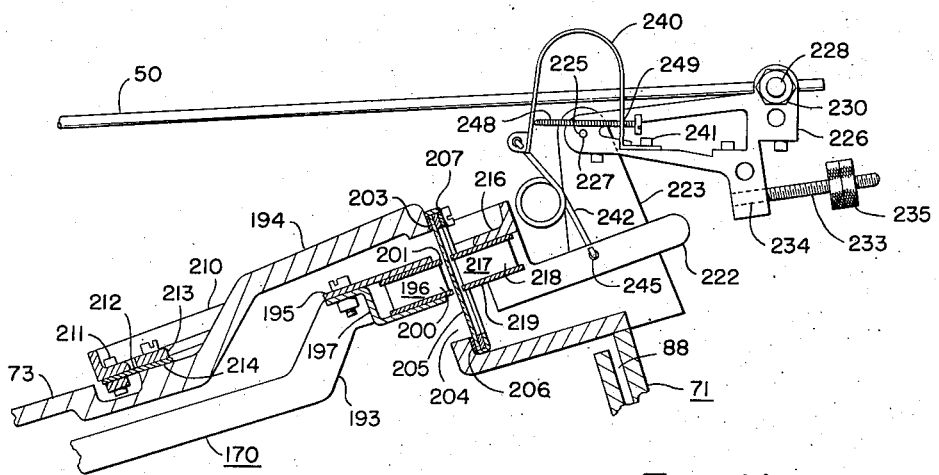
Figure 11 is a sectional side elevation of pointer operating mechanism associated with the instrument shown in Figures 3 to 10, taken on the line 11—11 of Figure 3 and as viewed in the direction indicated by the arrows.
Figure 8:
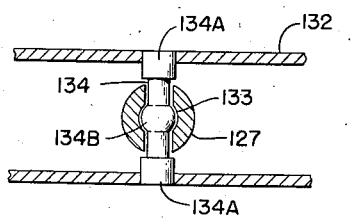
Figure 8 is a sectional plan view taken on the line 8—8 of Figure 7.
Figure 12:
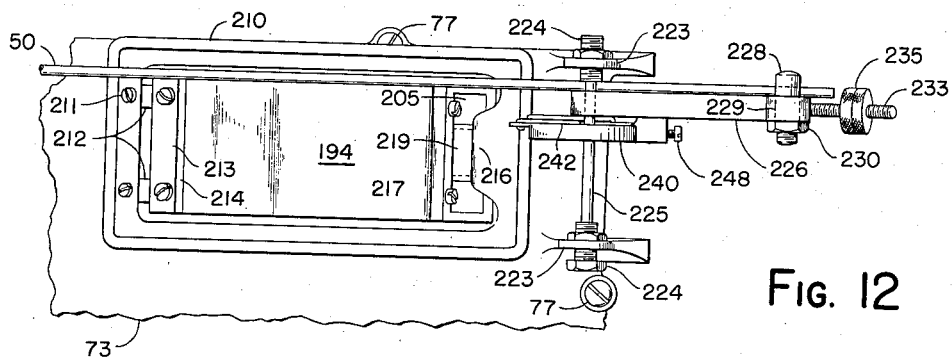
Figure 12 is a plan view of the mechanism shown in Figure 11.

The instrument 11 includes an element coupled with the diaphragm and adapted to move with the diaphragm when that diaphragm is subjected to a pressure difference. The element is in the form of an arm 170 including a transverse part 171 secured to the free rearward end of the biassing spring 96 and a main part 172 offset in relation to the spring and extending rearwardly away from the pivotal mounting of the beam 100. The transverse part 171 includes a channel-like central portion 173 (see Figure 10) arranged to extend upwardly through the central slot 121 in the spring 96 with the adjacent portions 174 disposed below the spring 96 and respectively secured by a group of three rivets 175 to the parts of the spring 96 which lie on either side of the slot 121. The base of the channel-like portion 173 is formed with an aperture 176 for the accommodation of the upper end of the rod 94 whilst the sides of the channel-like portion 173 are formed with holes 177 for the passage of a straight end portion 178A of a pin 178 which passes through those holes and through a corresponding hole 179 in the rod 94 (see Figure 10). Beyond the straight portion 178A, the pin 178 is bent around to one side in a complete loop 178B and projects on the other side of the straight portion 178A at first normally thereto and then as an S-like portion 178C extending towards that end of the straight portion 178A which is remote from the loop portion 178B. As shown in Figure 9, with the straight portion 178A extending through the holes 177 and 179, the end part of the portion 178C of S-like form is sprung past a side of the channel-like portion 173 into the space between the two sides of that portion 173 so that the pin is secured in position. Since the pin 178 is of circular cross-section and of small diameter, force is transmitted from the rod 94 to the arm 170 with very little friction.

The main part 172 of the arm 170 is formed, near the biassing spring 96, with an edge strengthening flange 192 and the rearward portion 193 of the arm 170 is cranked upwardly in order to suitably position the portion 193 within an upstanding hollow projection 194 formed on the casing cover 73 adjacent the side thereof remote from the link rod 127.

A rearward end part of the arm 170 is bent over along its upper edge to form a shelf 195 to the underside of which is secured a permanent magnet assembly 196 clamped to the shelf 195 by a clip 197 and cemented in position.

The magnet assembly 196 comprises a relatively thick plate or block 200 of the ceramic permanent magnet material known as "Magnadure" sandwiched between two plate pole pieces 201 of high permeability material. As shown most clearly in Figure 11, the plate pole pieces 201 extend beyond the edges of the plate 200 and the rearward edges of the two pole pieces 201 both lie in the same plane and in the plane of a machined planar face 203 which surrounds a window 204 formed in the rearward end of the projection 194. The window 204 is closed in a pressure-tight manner by a thin diaphragm 205 of suitable material sandwiched between two gaskets 206 and clamped to the face 203 by a retaining plate 207. Since one of the gaskets 206 is positioned between the diaphragm 205 and the face 203, a small clearance exists between the rearward edges of the pole pieces 201 and the diaphragm 205.

As seen in plan view, the projection 194 is rectangular in shape, and a magnet tray 210 moulded from lightweight material and formed by a rectangular frame the sides of which are of L-shaped cross-section loosely embraces the projection 194 and at its forward end is clamped by bolts 211 to two short, weak, spring strips 212 that at their rearward ends are clamped under a bar 213 to a transverse shelf 214 on the outside of the casing cover 73 at the forward end of the projection 194. The forward side of the tray 210 is formed with a shelf 216 to which is cemented a magnet assembly 217 similar to that secured to arm 170 and comprising a plate 218 of permanent magnet material sandwiched between and cemented to two pole pieces 219 of high permeability material. It is to be noted that the distance between the pole pieces 219 is exactly equal to the distance between the pole pieces 201, and that the plates 200, 218 of permanent magnet material are so oriented that the upper pole piece 201 is of North-seeking polarity, the upper pole piece 219 is of South-seeking polarity, the lower pole piece 201 is of South-seeking polarity and the lower pole piece 219 is of North-seeking polarity. The tray 210 is assembled in position after the stainless steel diaphragm 205 has been clamped in position and is adjusted by movement of the spring strips 212 under the clamp bar 213 so that over a desired limited range of rocking movement of the tray 210 on the pivot formed by the spring strips 212, representing the operating range of the instrument, the pole pieces 219 have a very small clearance from the diaphragm 205.

The tray 210 is moulded with a metal insert that forms a rearwardly extending arm 222 which extends between two upstanding arms 223 that are formed integrally with the casing cover 73 and are formed with aligned screw-threaded holes into which are screwed respectively two pivot screws 224 adapted to form bearings for a pivot spindle 225 for the pointer 50.

Mounted on the spindle 225 is a pointer moulding 226 in the form of a substantially triangular frame made from lightweight plastic material and formed near the apex of the triangle with a hole 227 through which the spindle 225 extends, the moulding being cemented in position on the spindle near to one end thereof. The pointer 50 is clamped to the moulding 226 by a pinch bolt 228 that extends through a hole 229 formed in the moulding near the base of the triangle and can be drawn into the hole 229 by a nut 230 engaging one face of the moulding, the pointer extending through a transverse hole in the bolt 228 and being drawn by the nut 230 against the face of the moulding opposite to that engaged by the nut. A screw-threaded stud 233 is cemented into a hole 234 in the moulding at the base of the triangle so as to extend transversely of the spindle 225 and carries a pair of locked counterbalance weights 235. A radius spring 240 of C-shape is located at one end by a peg 241 formed on one of the sides of the triangular frame and is cemented to the frame in that position. A single turn wire spring link 242 is hooked onto the free end of the C-spring 240 and extends with the plane of its single turn normal to the axis of spindle 225, the free end of the spring link 242 being hooked into a hole 245 in the arm 222. The C-spring 240 is fitted with an adjusting screw 248 extending through a screw-threaded hole 249 in one arm of the C-spring and arranged to bear against the opposite arm of the C-spring so that by adjustment of the screw 248 the distance between the spindle 225 and the point of attachment of the spring link 242 to the C-spring 240 may be varied. It will be seen that rocking movement of the tray 210 will, through the spring link 242 and the C-spring 240, cause rocking of the moulding 226 about the axis of the spindle 225. The movement imparted to the pointer flag 51 by movement of the tray 210 is thus arcuate about the axis of spindle 225, the force transmitted by the intervening linkage being limited by the spring link 242 and the velocity ratio of the linkage being variable by adjustment, through the screw 248, of the effective radius of the free end of the C-spring 240. The counterbalance weights 235 are adjusted so that no rocking force is exerted upon the tray 210 by the subsequent mechanism at at least one position of the pointer flag 51.

Figure 13:
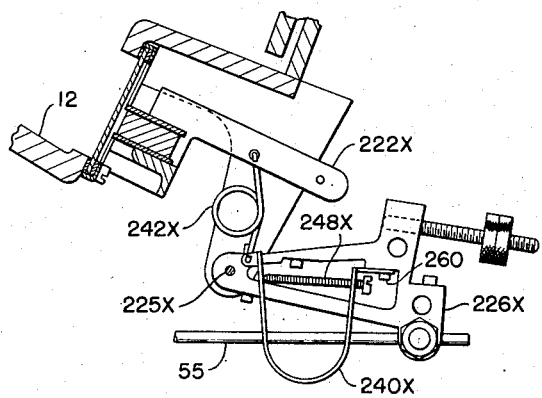
Figure 13 is a sectional side elevation similar to the right-hand side of Figure 11 and showing a modification of that mechanism utilized in the upper of the two instruments shown in Figure 2.

The upper instrument 12 is in most respects similar to the lower instrument 11 described above, but the pointer operating mechanism connecting the arm corresponding to the arm 222 is modified as shown in Figure 13 in order that movement of the diaphragm of the upper instrument in a downward direction shall cause upward movement of the flag 56 associated with that instrument. Thus a pointer pivot spindle 225X has cemented to it a pointer moulding 226X which is in all respects similar to the pointer moulding 226, a C-spring 240X equivalent to the C-spring 240 being located at one end by a peg 260 formed on one of the sides of the moulding and being cemented in that position, the peg being so located on the moulding that the free end of the C-spring 240X lies on the side of the pivot spindle 225X which is remote from the pointer flag 56. A spring link 242X similar to the spring link 242 is connected to the free end of the C-spring 240X and to an arm 222X equivalent to the arm 222. The velocity ratio is adjustable by screw 248X, which is equivalent to the screw 248, and in the embodiment shown is smaller than that used for the instrument 11. It will be seen that the only difference in the operation of the mechanisms associated with the instruments 11 and 12 is that by the positioning of the C-spring 240X in the manner shown an inversion is introduced in the direction of movement transmitted from the arm 222X to the flag 56. The pointer 55 is cranked sidewardly in order that the flag 56 shall lie at about the mid-point of the width of the instrument (see Figure 1).

The casings of the two instruments 11 and 12 are so arranged to converge rearwardly that the pivotal axes of the pointer spindles 225 and 225X are co-axial, and the arcuate scales 52 and 57 curve about the common axis of the two spindles. Since the upstanding arms 223 formed integrally with the casing cover 73 of instrument 11 are offset towards one side of the casing (see Figure 3), and the corresponding arms on the casing cover of the upper instrument 12 are similarly offset, the co-axial arrangement of the spindles 225 and 225X is readily obtained using instruments which are similar to one another, so providing an arrangement in which two similar instruments are accommodated in a horizontal width equal to that required for but one instrument. Furthermore, the instruments 11 and 12 are separately removable and readily replaceable in their correct positions in the housing.

In the use of the twin-instrument assembly, a first pair of pressures is applied to the instrument 11 respectively through the nipples 26 and 27 and a second pair of pressures is applied to the instrument 12 respectively through the nipples 21 and 22.

In the instrument 11, pressure fluid supplied through nipple 26 to the space 87 below the diaphragm 74 tends to force the rod 94 upwardly and pressure fluid supplied through nipple 27 to the space 89 above the diaphragm 74 tends to force the rod 94 downwardly, and the resultant force produced on the rod 94 gives an indication of the difference between the two pressures. The position occupied by the rod 94 will depend upon this force, upon the rate of the biassing spring 96, and upon the zero position to which the biassing spring 96 is set by means of the coarse adjusting screw 135 and the fine adjusting screw 149.

Movement of the rod 94 upon change in the difference between the two pressures will be transmitted by the arm 170 and by the magnetic coupling comprising the magnet assemblies 196 and 217 to the spring link 242 and thence through the C-spring 240 and the pointer moulding 226 to the pointer 50 and the flag 51.

In a similar manner, instrument 12 acts to position the flag 56 to give an indication of the difference between the second pair of pressures.

Figure 14:
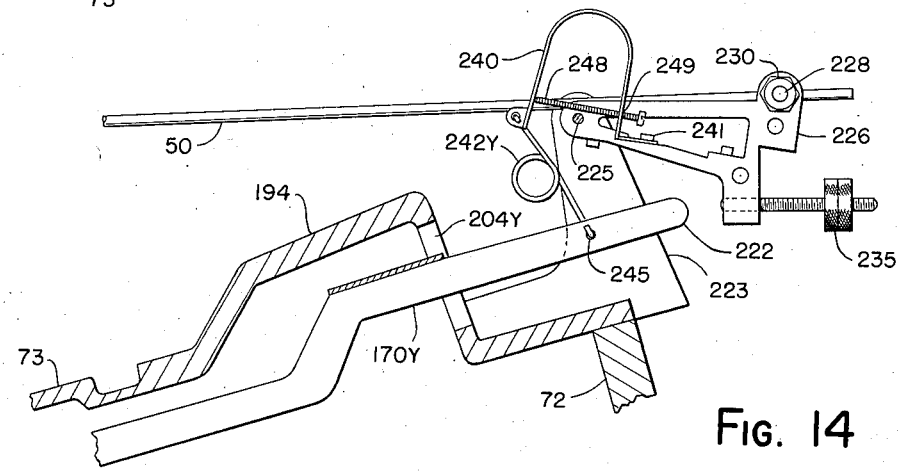
Figure 14 is a sectional side elevation of a modified form of the mechanism shown in Figure 11.

Each of the instruments 11 and 12 is adapted to give an indication of the difference between two positive pressures, that is to say, super-atmospheric pressures. When one of the pressures involved is that of the surrounding atmosphere, the instrument concerned can be so arranged that the non-atmospheric pressure (which may be either positive or negative) is applied to the space between the diaphragm and the casing base, the part of the casing on the other side of the diaphragm being caused to operate at atmospheric pressure by the omission of the diaphragm 205. The combination of arm 170, the tray 210, the magnetic couplings 196 and 217 and the arm 222 can then be replaced, as shown in Figure 14, by a modified arm 170Y that extends through a window 204Y corresponding to the window 204 and, near its rear end, is coupled directly to a spring link 242Y equivalent to the spring link 242.

The range of pressure differences to which the instrument 11 or 12 is adapted to respond may be changed by replacement of a biassing spring (corresponding to the biassing spring 96) in the instrument concerned with another spring having a different rate. Moreover, in order to enable a large increase in the maximum range to be effected whilst maintaining a conservative rating of the biassing spring, each instrument may be provided with a set of diaphragm masking means in the form of a number of pairs of clamp plates.

Figure 15:
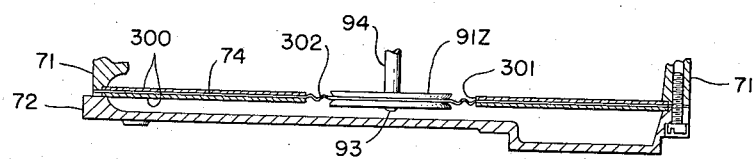
Figure 15 is a sectional side elevation of part of a modified instrument adapted to be subject to higher pressure differences, and corresponds to the lower part of Figure 6.
Figure 16:
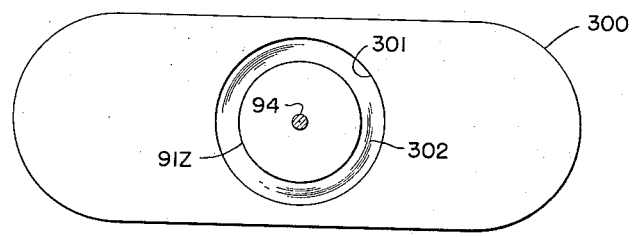
Figure 16 is a plan view of one of two masking clamp plates shown in Figure 15.

Figures 15 and 16 show a pair of diaphragm masking plates 300 fitted to the instrument 11, the two plates being fitted between the instrument base 72 and the spacer 71, respectively on either side of the diaphragm 74. Each plate 300 is formed with a central circular aperture 301 arranged to lie co-axial with the rod 94, and the clamp plates 91Z used are smaller in size than the clamp plates 91 and such that an annular ring 302 of the diaphragm 74 is left unclamped to permit free axial movement of the rod 94 over a limited working range.

By utilising such a set of masking plates, the instrument may be provided with a diaphragm large enough for it to be effective to measure a small pressure difference and yet may be readily modified to measure a large pressure difference.

In the indicating instrument described above with reference to Figures 1 to 13, provision is made for a coarse zero setting adjustment which enables the indicating flag to be set at a desired zero region of the associated scale, and for a fine final zero setting adjustment, At the zero setting the diaphragm biassing spring is in its unstressed central position and the action of zero setting calls for no modification or adjustment of the linkage connecting the diaphragm to the indicating flag. Furthermore, since the adjusting means act directly upon the biasing spring, damage to the lightweight, and thus fragile, part of the mechanism connecting the diaphragm to the indicating flag during zero setting is rendered unlikely.

What we claim as new, and desire to secure by Letters Patent of the United States is:

1. An instrument assembly for mounting in an aperture of an instrument panel comprising, a housing mounted on the panel and having an open end in alignment with the aperture, a front cover including a window and a scale enclosing said open end, a sealed instrument casing fixed to said housing, a flexible diaphragm mounted in said casing and movable in response to variations in a pressure condition to be indicated, an indicating pointer having one end thereof cooperable with said scale and having the other end thereof operatively connected to said diaphragm for actuating said indicating pointer relative to scale upon variations in said condition, a movable support within said casing, a biasing spring mounted on said support and connected to said diaphragm for exerting a biasing force thereon, and an elongated rotatable shaft having one end operatively connected to said movable support and the other end thereof extending into an opening in said cover to be manually rotated from the front of said panel, said rotatable shaft being operative upon rotation thereof from the front of said panel to move said support relative to said casing and housing to vary the position of said diaphragm and said indicating pointer.

2. An instrument assembly comprising a two part casing having a flexible diaphragm clamped between said parts for movement in response to a change in a pressure condition, an actuating rod extending from the medial portion of said diaphragm for axial movement by deflection of said diaphragm, an indicator scale, an indicating pointer operatively connected to said actuating rod for movement relative to said scale in response to changes in the pressure condition, a pivotal beam mounted in said casing, a spring mounted in compression between a wall of said casing and said beam for exerting a biasing force on said beam, a leaf spring having one end clamped to said beam for movement therewith and the other end thereof operatively connected to said actuating rod for exerting a biasing force on said rod, a second actuating rod having one end attached to said beam and the other end thereof extending exteriorly of said casing, said second actuating rod having a slot in said other end, a lever arm positioned exteriorly of said casing and pivoted at one end thereof, a pin engaging said slot and fixed to said lever arm adjacent said one end thereof, a rotatable member threaded on said second actuating rod to determine the position of said pin in said slot for adjusting the position of said second actuating rod relative to said lever arm to effect adjustment of the position of the assembly comprising said pivotal beam, said leaf spring, the first said actuating rod, said diaphragm and said indicating pointer to effect a large degree of movement of said indicating pointer relative to said scale, and means for actuating the other end of said lever arm to effect a smaller degree of movement of said indicating pointer to provide a vernier adjustment of the position thereof relative to said scale.

3. An indicating instrument, including a casing, a diaphragm positioned within said casing and defining a pair of chambers on opposite sides of said diaphragm respectively, said diaphragm being movable in response to a pressure difference between said chambers, an indicating scale, an indicating pointer having one end operatively connected to said diaphragm and the other end thereof extending to said scale for indicating the value of said pressure difference, a movable support within said casing, a biasing spring for said diaphragm mounted on said support and operatively connected to said diaphragm, a lever pivoted at one end thereof on said casing and having an operative connection with said support for moving the same, and an elongated rotatable axially movable shaft having one end operatively connected to said lever, the other end of said shaft being manually rotatable to effect pivotable movement of said lever and movement of the assembly comprising said support, said biasing spring, said diaphragm and said indicating pointer to vary the position of said indicating pointer relative to said scale.

4. An instrument as claimed in claim 3 wherein said lever is positioned exteriorly of said casing and operatively connected to said support by an actuating stem having the opposite ends thereof pivotally connected to said support and said lever respectively.

5. An instrument as claimed in claim 4 wherein a coil spring is mounted in compression between a wall of said casing and said support encircling said stem, said support being spring biased by said spring.

6. An instrument as claimed in claim 5 wherein the pivotal connection between said stem and said lever includes a pin fixed to said lever and having a portion thereof slideably mounted within a slot in one end of said stem.

7. An instrument as claimed in claim 6 wherein a screw is threaded in said one end of said stem in engagement with said pin, said screw rotatable to vary the position of said pin in said slot.

8. An indicating instrument, including a casing, a diaphragm positioned within said casing and defining a pair of chambers on opposite sides thereof respectively, said diaphragm being movable in response to a pressure difference between said chambers, an indicating scale, an indicating pointer having one end operatively connected to said diaphragm and the other end thereof extending to said scale for indicating the value of said pressure difference, a movable support within said casing, a biasing spring for said diaphragm mounted on said support and operatively connected to said diaphragm, a lever pivoted on the exterior surface of said casing and having an operative connection with said support for moving the same, a rocker arm pivotally mounted on said exterior surface of said casing and having an abutment engageable with said lever for pivoting the same upon rotation of said rocker arm, and an elongated rotatable axially movable shaft having a portion thereof threaded in said rocker arm, one end thereof engaging said casing and the other end thereof terminating adjacent said scale, said shaft being manually rotatable to effect rotation of said rocker arm and to effect movement of said lever, said movable support, said biasing spring and said indicating pointer.

References Cited in the file of this patent

UNITED STATES PATENTS

| | | |
|---|---|---|
| 1,841,651 | Sprague et al. | Jan. 19, 1932 |
| 2,090,160 | Spitzglass et al. | Aug. 17, 1937 |
| 2,144,523 | Brown | Jan. 17, 1939 |
| 2,551,212 | Howe | May 1, 1951 |
| 2,559,402 | Comstock | July 3, 1951 |